United States Patent [19]

Phillips et al.

[11] 3,847,369

[45] Nov. 12, 1974

[54] CONTROL SURFACE DEPLOYMENT MECHANISM

[75] Inventors: Jack C. Phillips, St. Louis; Donald E. Bennett, Ferguson, both of Mo.

[73] Assignee: The United States of America as represented by the Secretary of the Navy, Washington, D.C.

[22] Filed: Mar. 8, 1973

[21] Appl. No.: 339,494

[52] U.S. Cl............................................. 244/42 R
[51] Int. Cl.............................................. B64c 9/14
[58] Field of Search........................................244/42

[56] References Cited
UNITED STATES PATENTS

| | | | |
|---|---|---|---|
| 1,830,122 | 11/1931 | Milburn........................... | 244/42 CA |
| 1,861,318 | 5/1932 | Page................................. | 244/42 CB |
| 2,147,968 | 2/1939 | Delanne........................... | 244/13 |
| 2,516,406 | 7/1950 | Moyer.............................. | 244/42 DB |
| 2,973,925 | 3/1961 | Wiele............................... | 244/42 CA |
| 3,258,855 | 7/1966 | Flower et al..................... | 35/12 |
| 3,638,886 | 2/1972 | Zimmer........................... | 244/42 CA |

FOREIGN PATENTS OR APPLICATIONS
767,558    7/1934    France ........................... 244/42 CA Primary Examiner—Trygve M. Blix
Assistant Examiner—Jesus D. Sotelo
Attorney, Agent, or Firm—R. S. Sciascia; P. Schneider; R. B. Rothman

[57] ABSTRACT

A deployment mechanism employing multiple, non-proportional, four-bar linkages for guiding the movement of an airfoil control surface. The linkages are connected at one of their ends to the airfoil control surface and at their other end to an airfoil. The connection points of each linkage to the airfoil define a set of lines which are skewed at progressively greater angles with respect to a reference line. The mechanism when activated guides the extension of the control surface into an overlapping position with the airfoil. The overlap forms a nozzle between the airfoil control surface and the airfoil surface. The amount of overlap at any point is a constant percentage of the airfoil chord length at that same point.

6 Claims, 3 Drawing Figures

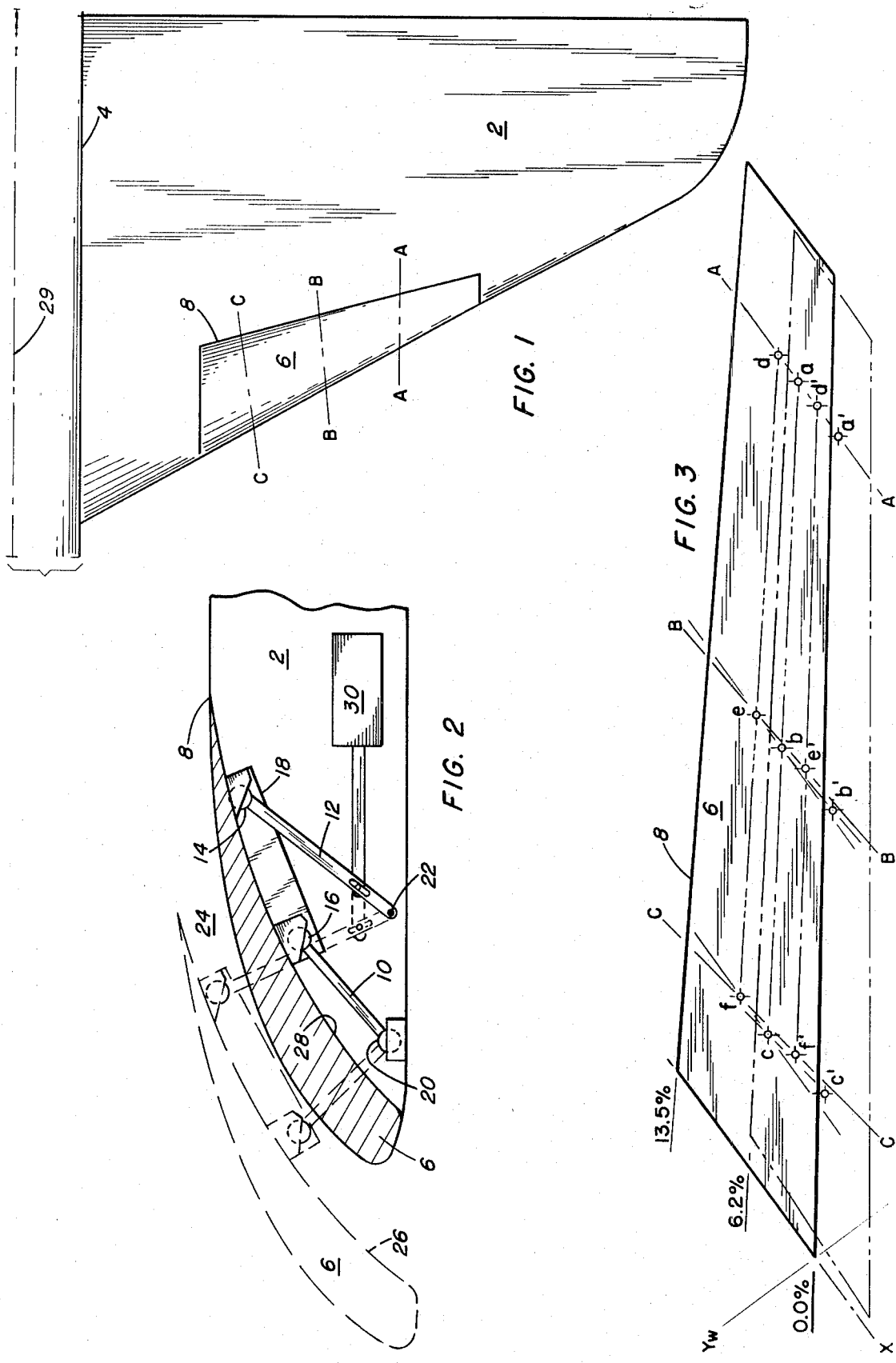

CONTROL SURFACE DEPLOYMENT MECHANISM

BACKGROUND OF THE INVENTION

This invention relates to deployment devices for aircraft control surfaces and especially to a deployment mechanism using multiple, nonproportional, four-bar linkages.

Proportional mechanisms have been employed in the past to provide conical or parallel trailing edge, flap motion. In existing aircraft, translating surface applications achieve motions which are normally conical about a theoretical vertex or normal to a reference line such as a wing trailing edge or spar. Such schemes do not always provide optimum aerodynamic characteristics.

SUMMARY OF THE INVENTION

The instant invention produces a motion which is neither conical nor parallel in the normal sense. Rather, the invention produces a motion which is basically parallel, in a streamwise sense, to the direction of flight. The mechanism guides the airfoil control surface into an overlapping extended position, the extent of overlap being a constant percentage of the airfoil surface chord length.

OBJECTS OF THE INVENTION

An object of this invention is to deploy an aircraft control surface in an overlapping extended position with respect to an airfoil surface of an aircraft such that the overlap is a constant percentage of the chord length of the airfoil surface at any point.

Another object is to form a nozzle between an overlapping airfoil control surface and an airfoil surface, the throat of which is a constant percentage of the chord length of the airfoil at any point.

A further object is to deploy an airfoil control surface in such a manner to increase the stall angle of an airfoil.

Other objects, advantages, and novel features of the invention will become apparent from the following detailed description of the invention when considered in conjunction with the accompanying drawings.

BRIEF DESCRIPTION OF THE DRAWINGS

FIg. 1 is a plan view of an aircraft wing incorporating one embodiment of this invention to deploy a leading edge slat;

FIG. 2 is a partial cross section of FIG. 1 taken along the line A—A and depicting one of the four-bar linkage mechanisms employed to support the slat; and FIG. 3 is a plan view of the slat showing its movement from stowed to extended position.

DESCRIPTION OF THE PREFERRED EMBODIMENT

FIG. 1, which illustrates a preferred embodiment of the invention, shows a swept aircraft wing 2 attached to a fuselage 4 at the root chord of the wing. The chord length of wing 2 decreases as one moves outboard from the root chord. A leading edge slat 6 is depicted on the wing; other control surfaces are not shown. The slat 6 is shown in its stowed position, in which its outer surface forms a part of a smooth wing contour or air-reaction surface of the airfoil.

The set of lines A—A, B—B, and C—C can best be explained by first examining FIG. 2, which is a partial cross section of wing 2 taken along the line A—A. FIG. 2 illustrates one of the four-bar linkage mechanisms which supports slat 6. The linkage mechanism includes two linkage members 10 and 12, connected by spherical, self-aligning joints 14 and 16 to an appendage 18 on the underside of slat 6. The members are connected to the wing 2 by a spherical, self-aligning joint 20 and a fixed pivot 22. The spherical, self-aligning joints are employed to provide motion freedom in all three axes, and any joints that will do the same could be employed.

Actuation of the entire slat may be accomplished at a single point by a control rod connected to a drive mechanism 30. The drive mechanism may be, for example, a simple hydraulic actuator. In the alternative, two or more of the four-bar supports may be powered using synchronized control rods and bellcranks connected to a common actuator.

The dotted lines in FIG. 2 illustrate the slat 6 in its deployed or extended position. Since connection points such as 16 and 14 and, therefore, appendages 18 are located only intermittently along the underside of slat 6, normally the smooth underside 26 of slat 6 and the smooth underlying surface 28 of the wing form an elongated nozzle between the extended slat and the wing. The overlap of surface 26 over surface 28 forms this nozzle; and, in order to optimize the flow through the nozzle in an aerodynamic sense, the amount of overlap at any point must be a constant percentage of the wing's chord length at the point.

The present invention achieves this result by employing the four-bar linkages in the following manner. In the preferred embodiment three pairs of linkage members are employed to support the slat 6. One such pair, the most outboard pair, is shown in FIG. 2. All three pairs of linkage members are connected in tandem as shown in FIG. 2 to the slat 6 and wing 2. The central pair of linkage members employs a sherical, self-aligning joint at 22 rather than a fixed pivot. Other than that, the pairs of linkages are exactly the same as the one shown in FIG. 2; however, they are not connected to the wing 2 in parallel. Instead, the lines defined by the connections 20 and 22 are skewed at progressively greater angles to the aircraft center line.

This concept is better illustrated in FIG. 1 in which the lines A—A, B—B and C—C represent the lines defined by the two connections 20 and 22 between each pair of linkage members and the wing 2. As can be seen, line A—A is parallel to the aircraft center line 29, while lines B—B and C—C are skewed at progressively greater angles to center line 29. In the preferred embodiment of the invention, as employed on the Phantom aircraft manufactured by the McDonnell Douglas Corporation of St. Louis, Missouri, the angles made by lines B—B and C—C with the center line 29 are substantially 5° and 8°, respectively. Of course, for other airfoil designs and differently oriented control surfaces the angles would vary. In addition, only two or more than three supporting pairs of linkage members may be employed.

FIg. 3 is a plan view of the slat 6 illustrating its movement from the stowed position, represented by the solid lines, to its extended position, represented by the dotted lines. In the preferred embodiment, the trailing edge 8 of the slat in the stowed position defines a line which at any point intersects a chord of the wing at 13.5 percent of its length. In its extended position the trailing edge of the slat overlaps 6.2 percent of any chord beneath it.

Lines A—A, B—B and C—C again represent the lines defined by the connections 20 and 22, while c-f, b-e, and a-d represent the connection points 16 and 14 in the stowed position. c'-f', b'-e', and a'-d' represent the connection points 16 and 14 in the extended position. Since connectors 22 for the inboard and outboard pair of linkage members are fixed, the slat will rotate about line f-e-d.

Because the overlap is kept at a constant percentage of chord length in the slat extended position, the elongated nozzle throat formed by the overlap will also be a constant percentage of the chord length at any point. This configuration will prevent flow separation from the wing much better than one in which the overlap and nozzle throat area are a variable percentage of the chord length. The stall angle of the wing will therefore be higher in the slat extended position using the instant invention, and aircraft performance will be improved.

It should further be noted that although the invention as herein disclosed has been employed to move a leading edge slat on a wing, it could also be employed to guide and support the deployment of various airfoil control surfaces on an airfoil.

Obviously, many modifications and variations of the present invention are possible in light of the above teachings. It is therefore to be understood that, within the scope of the appended claims, the invention may be practiced otherwise than as specifically described.

What is claimed is:

1. An airfoil for use with an aircraft, said airfoil comprising:
   a wing, said wing having a maximum chord length at the root chord, the chord length decreasing in the outboard direction;
   a slat, having a trailing edge, mounted on said wing and adapted to act as a portion of the outer surface of said wing when in a first stowed position; and
   means for moving said slat in a streamwise parallel direction to a second extended position, in which position the trailing edge of said slat overlaps said wing to form a nozzle between said slat and said wing, said slat having the shape of a wedge when viewed from above the wing, the flare of the wedge being configured to provide, at all points, a constant percentage of overlap distance to root chord length and of the extent of the throat of the nozzle to root chord length.

2. The airfoil of claim 1 wherein the moving means comprises:
   a plurality of pairs of linkage members, each member having first and second ends;
   means on said first ends for connecting said members to said wing; and
   means on said second ends for connecting said members to said slat.

3. An airfoil for use with an aircraft, said airfoil comprising:
   a wing, said wing having a maximum chord length at the root chord, the chord length decreasing in the outboard direction;
   a slat, having a trailing edge, mounted on said wing and adapted to act as a portion of the outer surface of said wing when in a first stowed position; and
   means for moving said slat in a streamwise parallel direction to a second extended position, in which position the trailing edge of said slat overlaps said wing to form a nozzle between said slat and said wing, the percentage formed by the extent of overlap relative to the root chord, and the percentage formed by the extent of the throat of the nozzle relative to the root chord, being constant at all points along the slat;
   said moving means comprising a plurality of pairs of linkage members, each having first and second ends, means on said first ends for connecting said members to said wing, and means on said second ends for connecting said members to said slat,
   the first ends of the most outboard pair of linkage members being connected in tandem along a line parallel to the root chord of the wing, and the first ends of the remaining pairs of linkage members being connected in tandem to said wing along lines that are skewed at progressively greater angles to the root chord as one moves inboard from pair to pair.

4. The airfoil of claim 3 wherein the slat connecting means are spherical, self-aligning joints.

5. The airfoil of claim 4 wherein at least two of the wing connecting means are fixed-axis, pivot joints.

6. The airfoil of claim 5 wherein there are at least three pairs of linkage members, the wing connecting means of the most inboard and most outboard pair including one fixed-axis, pivot joint, the remaining connecting means comprising spherical, self-aligning joints.

* * * * *